US012661696B2

(12) United States Patent
Cyrek et al.

(10) Patent No.: US 12,661,696 B2
(45) Date of Patent: Jun. 23, 2026

(54) METHOD OF REMOVING CONTAMINANTS FROM A DIFFUSION-COATED COMPONENT

(71) Applicant: General Electric Company, Schenectady, NY (US)

(72) Inventors: Michal Jerzy Cyrek, Warsaw (PL); Michal Chomka, Warsaw (PL); Mingjia Shao, Shanghai (CN)

(73) Assignee: General Electric Company, Evendale, OH (US)

( * ) Notice: Subject to any disclaimer, the term of this patent is extended or adjusted under 35 U.S.C. 154(b) by 51 days.

(21) Appl. No.: 18/783,687

(22) Filed: Jul. 25, 2024

(65) Prior Publication Data

US 2024/0375155 A1     Nov. 14, 2024

Related U.S. Application Data

(62) Division of application No. 17/665,882, filed on Feb. 7, 2022, now Pat. No. 12,138,669.

(30) Foreign Application Priority Data

Mar. 10, 2021    (EP) .................................... 21461524

(51) Int. Cl.
| | |
|---|---|
| *C23C 10/02* | (2006.01) |
| *B08B 7/00* | (2006.01) |
| *B23K 26/062* | (2014.01) |
| *B23K 26/36* | (2014.01) |
| *B23K 35/36* | (2006.01) |
| *B23P 6/00* | (2006.01) |
| *B23P 6/04* | (2006.01) |

(52) U.S. Cl.
CPC .......... *B08B 7/0014* (2013.01); *B08B 7/0042* (2013.01); *B23K 26/062* (2015.10); *B23K 26/36* (2013.01); *B23K 35/361* (2013.01); *B23P 6/007* (2013.01); *B23P 6/045* (2013.01); *C23C 10/02* (2013.01)

(58) Field of Classification Search
CPC .......... C23C 10/02; C23C 10/08; C23C 10/14
See application file for complete search history.

(56) References Cited

U.S. PATENT DOCUMENTS

| | | | |
|---|---|---|---|
| 4,904,498 | A | 2/1990 | Wu |
| 5,419,971 | A | 5/1995 | Skelly et al. |
| 5,662,762 | A | 9/1997 | Ranalli |
| 5,723,078 | A | 3/1998 | Nagaraj et al. |
| 5,986,234 | A | 11/1999 | Matthews et al. |
| 6,217,668 | B1 | 4/2001 | Czech et al. |
| 6,384,370 | B1 | 5/2002 | Tsunemi et al. |

(Continued)

*Primary Examiner* — Hai Y Zhang
(74) *Attorney, Agent, or Firm* — Dority & Manning, P.A.

(57)    ABSTRACT

A method of removing contaminants from a surface of a gas turbine engine component protected by a diffusion coating that comprises an additive layer on the surface of the component and a diffusion zone in the surface of the component. The method includes subjecting the surface containing contaminants to laser beam pulses to remove contaminants from the component such that contaminants on the surface of the component are removed without damaging or removing the diffusion zone of the diffusion coating. Methods for controlled removal of at least a portion of a thickness of a diffusion coating from a coated superalloy component are also provided.

19 Claims, 5 Drawing Sheets

(56) References Cited

U.S. PATENT DOCUMENTS

| | | | |
|---|---|---|---|
| 8,741,381 B2 | 6/2014 | Zhang et al. | |
| 9,334,806 B2 | 5/2016 | Carter et al. | |
| 9,358,663 B2 | 6/2016 | Fulton et al. | |
| 9,415,462 B2 | 8/2016 | Hugot et al. | |
| 9,592,541 B2 | 3/2017 | Bruck et al. | |
| 2003/0083213 A1 | 5/2003 | Kool et al. | |
| 2014/0082939 A1* | 3/2014 | Hugot | F01D 5/005 |
| | | | 29/889.1 |
| 2017/0081977 A1* | 3/2017 | Zhang | C23F 1/20 |
| 2018/0333804 A1 | 11/2018 | Colletti et al. | |
| 2019/0001438 A1 | 1/2019 | Ehling | |

* cited by examiner

500

Remove Contaminants from
Component Using Laser
Beam Pulses ⌐502

Optionally Remove Oxide
Layer and Portion of Additive
Layer ⌐503

Apply Aluminde Coating ⌐505

Diffusion Heat Treating ⌐507

METHOD OF REMOVING CONTAMINANTS FROM A DIFFUSION-COATED COMPONENT

PRIORITY INFORMATION

The present application claims the benefit of priority to, and is a divisional application of, U.S. patent application Ser. No. 17/665,882 filed on Feb. 7, 2022, which is incorporated by reference herein for all purposes in its entirety, and claims the benefit of priority to European Patent Application Number 21461524.7 filed on Mar. 10, 2021.

FIELD

The present disclosure generally relates methods for repairing gas turbine engine components protected by diffusion coatings and more particularly, to methods for removing a contaminant from the diffusion coating.

BACKGROUND

When turbines are used on aircraft or for power generation, they are typically run at a temperature as high as possible, for maximum operating efficiency. Since high temperatures can damage the alloys used for the components, a variety of approaches have been used to raise the operating temperature of the metal components.

Nickel-base superalloys are used in many of the highest-temperature materials applications in gas turbine engines. For example, nickel-base superalloys are used to fabricate the components such as high-pressure and low-pressure gas turbine blades, vanes or nozzles, stators and shrouds. These components are subjected to extreme conditions of both stress and environmental conditions. The compositions of the nickel-base superalloys are engineered to carry the stresses imposed upon the components. Protective coatings are typically applied to the components to protect them against environmental attack by the hot, corrosive combustion gases.

A widely used protective coating is an aluminum-containing coating termed a diffusion aluminide coating. Diffusion processes generally entail reacting the surface of a component with an aluminum-containing gas composition to form two distinct zones, the outermost of which is an additive layer containing an environmentally-resistant intermetallic represented by MAl, where M is iron, nickel or cobalt, depending on the substrate material. The MAL intermetallic is the result of deposited aluminum and an outward diffusion of iron, nickel and/or cobalt from the substrate. During high temperature exposure in air, the MAl intermetallic forms a protective aluminum oxide (alumina) scale or oxide layer that inhibits oxidation of the diffusion coating and the underlying substrate. The chemistry of the additive layer can be modified by the presence in the aluminum-containing composition of additional elements, such as platinum, chromium, silicon, rhodium, hafnium, yttrium and zirconium. Diffusion aluminide coatings containing platinum, referred to as platinum aluminide coatings, are particularly widely used on gas turbine engine components.

The second zone of a diffusion aluminide coating is formed in the surface region of the component beneath the additive layer. The diffusion zone contains various intermetallic and metastable phases that form during the coating reaction as a result of diffusional gradients and changes in elemental solubility in the local region of the substrate. The intermetallics within the diffusion zone are the products of the various alloying elements of the substrate and diffusion coating.

Though significant advances have been made with environmental coating materials and processes for forming such coatings, there is the inevitable requirement to repair or replace these coatings under certain circumstances. For example, removal may be necessitated by erosion or thermal degradation of the diffusion coating, refurbishment of the component on which the coating is formed, or an in-process repair of the diffusion coating or a thermal barrier coating (if present) adhered to the component by the diffusion coating. The current state-of-the-art repair process is to completely remove a diffusion aluminide coating by treatment with a combination of mechanical and chemical treatments. For example, diffusion aluminide coatings can be removed by grit blasting followed by treatment with an acidic solution capable of interacting with and removing both the additive and diffusion layers.

Removal of the entire aluminide coating, which includes the diffusion zone, results in the removal of a portion of the substrate surface. For components, such as gas turbine engine blade and vane airfoils, removing the diffusion zone may cause alloy depletion of the substrate surface and, for air-cooled components, excessively thinned walls and drastically altered airflow characteristics to the extent that the component must be scrapped.

Most methods currently used to remove diffusion coatings to expose the surface of the superalloy component or to completely remove the additive layer include using an acid strip, multiple grit blastings, and subsequent heat tinting processes to verify that the aluminide is completely removed from the surface of the superalloy component. The acid strip uses harsh chemicals such as phosphoric, nitric, or hydrochloride acids that require special facilities to remove the additive layer and the diffusion layer.

Therefore, improved methods for cleaning, inspecting, and rejuvenating coated articles are needed.

BRIEF DESCRIPTION

In one aspect, embodiments of the present disclosure relate to a method for the removal of contaminants from a coated superalloy component having a diffusion coating comprising an additive layer on a surface of the component and diffusion zone in the surface of the component. The method includes providing the coated superalloy component having one or more contaminants on the surface of the component; and subjecting the surface of the component containing contaminants to laser beam pulses to remove contaminants from the component such that the one or more contaminants are removed without damaging or removing the diffusion zone of the diffusion coating.

In another aspect, embodiments of the present disclosure relate to a method for rejuvenating a coated superalloy component having a surface, the coated superalloy component having undergone service at an elevated temperature. The method includes providing the coated superalloy component having a diffusion coating comprising an additive layer on a surface of the component and a diffusion zone in the surface of the component; removing one or more contaminants from the component by subjecting the component to laser beam pulses to remove contaminants from the component such that contaminants are removed without damaging or removing the diffusion zone of the diffusion coating creating an exposed portion of diffusion zone or exposed portion of additive layer; optionally, selectively removing at least a portion of the additive layer using laser beam pulses; applying an aluminide coating to the exposed portion of diffusion zone or exposed portion of additive layer; and diffusion heat treating at a preselected elevated temperature to form a rejuvenated protective aluminide coating on the superalloy component. Optionally, the method can also include repairing the coated superalloy component prior to applying the aluminide coating thereon.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Figure 1:
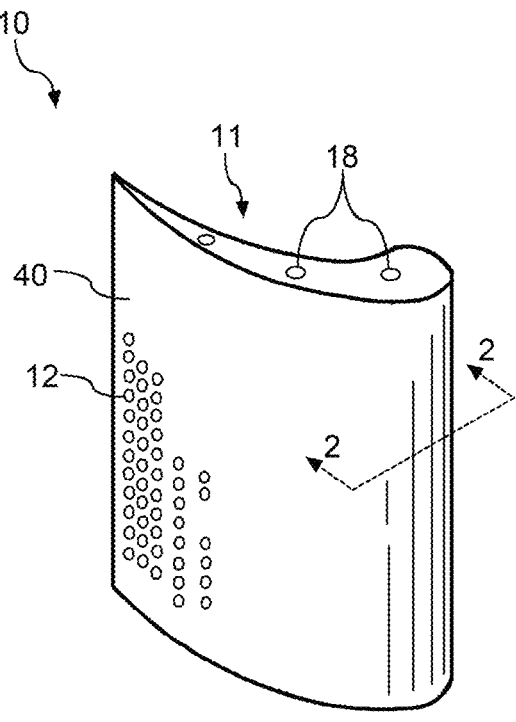
FIG. 1 is a perspective view of a component having undergone service at an elevated temperature according to the present disclosure.

One or more embodiments of the present disclosure will be described below. Unless defined otherwise, technical and scientific terms used herein have the same meaning as is commonly understood by one of ordinary skill in the art to which this invention belongs.

The terms "a" and "an" do not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about", are not to be limited to the precise value specified. Additionally, when using an expression of "a first value—a second value," the is intended to modify both values. In at least some instances, the approximating language may correspond to the precision of an instrument for measuring the value.

Here, and throughout the specification and claims, range limitations may be combined and/or interchanged, such ranges are identified and include all the sub-ranges contained therein unless context or language indicates otherwise. Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The methods of the present disclosure can include, consist essentially of, or consist of, the components of the present disclosure as well as other materials described herein. As used herein, "consisting essentially of" means that the composition or component may include additional materials, but only if the additional materials do not materially alter the basic and novel characteristics of the claimed composition or methods.

Provided is a method for removal of contaminants from an article having a diffusion coating thereon. Also, provided is a method for rejuvenating a coated superalloy component having undergone service at an elevated temperature. The present disclosure is generally applicable to components that are protected from a thermally and chemically hostile environment by a diffusion coating, such as a diffusion aluminide coating or a diffusion chromide coating. Notable examples of such components include the high and low pressure turbine nozzles and blades, shrouds, combustor liners and augmentor hardware of gas turbine engines. While the advantages of this disclosure are particularly applicable to gas turbine engine components, the teachings of this disclosure are generally applicable to any component on which a diffusion coating may be used to protect the component from its environment.

One advantage of an embodiment of the present disclosure includes reduced time and labor for recoating or rejuvenating a superalloy component after service in a turbine. Another advantage of an embodiment of the present disclosure is reduced cost in recoating and rejuvenating components after service in a turbine. Yet another advantage of an embodiment of the present disclosure is that the rejuvenated coating on the superalloy component has substantially the same chemistry as an originally manufactured superalloy component having a protective aluminide coating prior to any service in a turbine. Another advantage of an embodiment of the present disclosure is that the coating microstructure and chemistry of the rejuvenated coating meet engineering requirements. Yet another advantage of an embodiment of the present disclosure is that the method and rejuvenated coating maintain dimensional and airflow requirements and improve repair hardware yields. Another advantage of an embodiment of the present disclosure is that the method consumes less wall thickness than a full-stripping repair using acids.

FIG. 1 depicts a coated superalloy component 10 after service in a turbine that can be used with the method of the present disclosure, and in this illustration is an airfoil 11. As shown in the figures, cooling holes 18 are present in airfoil 11 through which bleed air is forced to transfer heat from airfoil 11. Particularly suitable materials for component 10 include nickel based superalloys, though it is foreseeable that other materials could be used. Although depicted as airfoil 11, component 10 includes, but is not limited to, high-pressure and low-pressure gas turbine blades, vanes or nozzles, stators and shrouds. As shown in FIG. 1, after service life, which is 12,000 to 24,000 hours at temperatures exceeding 800° C. (1500° F.), component 10 can have a contaminant 12 thereon.

Contaminant 12 can include any of hot corrosion products, dirt, dust, oxides, and combinations thereof. For example, hot corrosion of gas turbine engine components generally occurs when sulfur and sodium react during combustion to form sodium sulfate ($Na_2SO_4$), which condenses on and subsequently attacks the components' surfaces. Sources of sulfur and sodium for hot corrosion reactions include impurities in the fuel being combusted as well as the intake of sodium laden dust and/or ingestion of sea salt. In the latter situation, hot corrosion typically occurs on hot section turbine blades and vanes under conditions where salt deposits on the component surface as a solid or liquid. The salt deposits can break down the protective alumina scale on the aluminide coating, resulting in rapid attack of the coating. Hot corrosion produces a loosely adherent external scale with various internal oxides and sulfides penetrating below the external scale. These products are generally sulfur and sodium compounds with elements present in the alloy and possibly other elements from the environment, such as calcium, magnesium, chlorine, etc. As such, hot corrosion products are distinguishable from oxides that normally form or are deposited on gas turbine engine components as a result of the oxidizing environment to which they are exposed. The terms "a contaminant" and "contaminants" are used interchangeably herein to refer to any contamination in any form on the diffusion coating present after service (i.e., operational use) of the component and that is to be removed before further use of the component.

Figure 2:
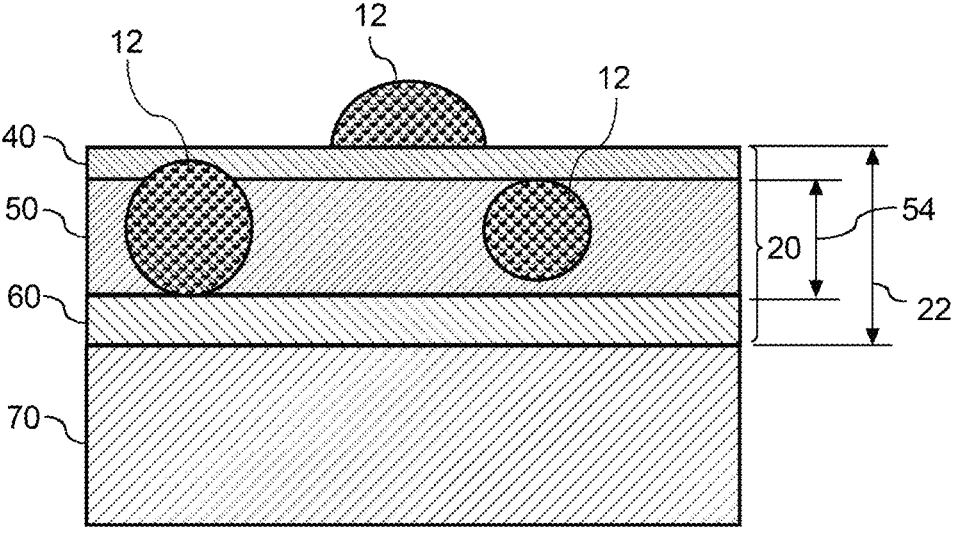
FIG. 2 is a schematic sectional view taken in direction 2-2 of FIG. 1 of the component having undergone service according to example embodiments of the present disclosure.

FIG. 2 is a cross-sectional view of the coated superalloy component 10 of FIG. 1 after 12,000 to 24,000 hours of service in a turbine. Coated superalloy component 10 includes a diffusion coating 20 on superalloy substrate 70. Diffusion coating 20 includes an additive layer 50 formed on the superalloy substrate 70 and a diffusion zone 60 that is formed in the surface of the superalloy substrate 70. In one embodiment, the diffusion coating 20 further includes an oxide layer 40 on the additive layer 50 formed by exposure to an oxidizing environment.

With further reference to FIG. 2, a typical thickness 22 of diffusion coating 20 is 38 microns (1.5 milli-inches or mils) to 102 microns (4.0 mils), or alternatively 45 microns to 90 microns, or alternatively 50 microns to 80 microns. Thickness 22 of diffusion coating 20 includes thickness of oxide layer 40, thickness of additive layer 50 and thickness of diffusion zone 60. Oxide layer 40 is generally very thin and is 5 microns to 10 microns, or alternatively 6 microns to 9 microns, or alternatively 7 microns to 8 microns. For certain diffusion coatings 20 the oxide layer 40 may not be present. Additive layer 50 is between oxide layer 40 and diffusion zone 60. Additive layer 50 typically has a thickness 54 of 12.7 microns (0.5 mils) to 63.5 microns (2.5 mils), or alternatively 17.8 microns (0.7 mils) to 50.8 microns (2.0 mils), or alternatively 22.9 microns (0.9 mils) to 43.1 microns (1.7 mils). Additive layer 50 contains an environmentally resistant intermetallic phase MAl, where M is iron, nickel or cobalt, depending on the substrate material (mainly β (NiAl) if the substrate is nickel-based). Diffusion zone 60 is formed on and in a portion of the substrate between additive layer 50 and the bulk superalloy substrate 70 of the coated superalloy component 10. Thickness of diffusion zone 60 varies and is generally 7.6 microns (0.3 mils) to 17.8 microns (0.7 mils) thick, or alternatively 8 microns to 16 microns, or alternatively 9 microns to 15 microns. Superalloy substrate 70 generally includes nickel-, iron-, and cobalt-based superalloys but other superalloys are possible. Diffusion coating 20 can include, for example, an aluminide diffusion coating or a chromide diffusion coating.

Figure 3:
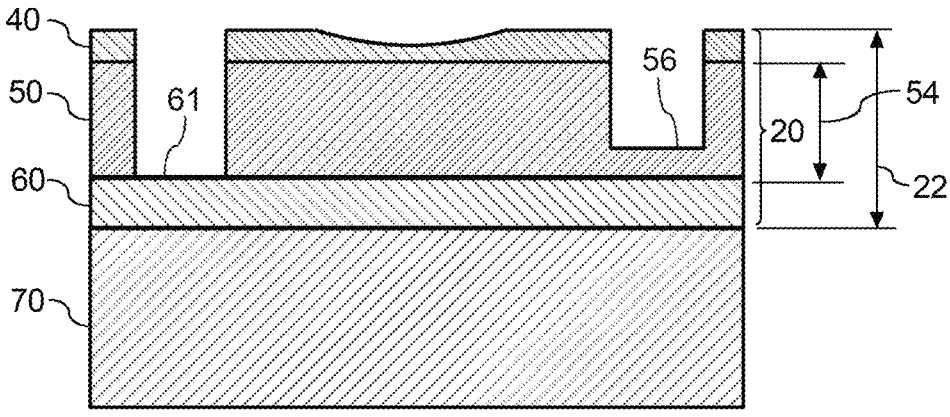
FIG. 3 is a schematic of the component of FIG. 2 after removal of contaminants according to example embodiments of the present disclosure.

As shown further in FIG. 2, a contaminant 12 is present on the surface of the component. For example, contaminants such as hot corrosion products, dirt, dust, or oxides may be present on the oxide layer 40, within the oxide layer 40, or within the additive layer 50. Contaminants 12 can be selectively removed from a coated superalloy component 10 by exposure to laser beam pulses. For example, as shown in FIG. 3, the contaminants 12 have been removed from the substrate 70. Removal of the contaminants 12 can also remove portions of the oxide layer 40 and additive layer 50, depending on the placement of the contaminants 12 within the structure. Removal of the contaminants 12 can create an exposed portion 61 of diffusion zone 60 or an exposed portion 56 of additive layer 50. The laser beam pulses used in the current method allow for visual inspection and removal of contaminants from diffusion coating 20. The laser beam pulses used to remove the contaminants 12 remove little or none of the diffusion zone 60 and do not remove any part of underlying superalloy substrate 70.

Subjecting the surface of the component to laser beam pulses includes directing a pulsed laser beam at the surface of the component, where each pulse of the laser has sufficient energy to melt or evaporate contaminants or portions of the coating. Various operating parameters of the pulsed laser will be further discussed herein, where "pulsed laser" refers to a laser emitting a pulsed laser beam. Additionally, the pulsed laser can generate a heat affected zone, and various parameters can be varied or modified to control the size of the heat affected zone such that undesirable heating affects and microcracking can be reduced. Pulsing the laser beam and controlling the laser parameters as provided herein allows for the selective removal of contaminants 12 and/or additive layer 50 from the component 10. For example, highly selective, controlled removal of portions of the contaminants 12 are possible. Additionally, by pulsing the laser beam, contaminants 12 can be removed without damaging the underlying diffusion zone 60 of the coating.

Figure 4:
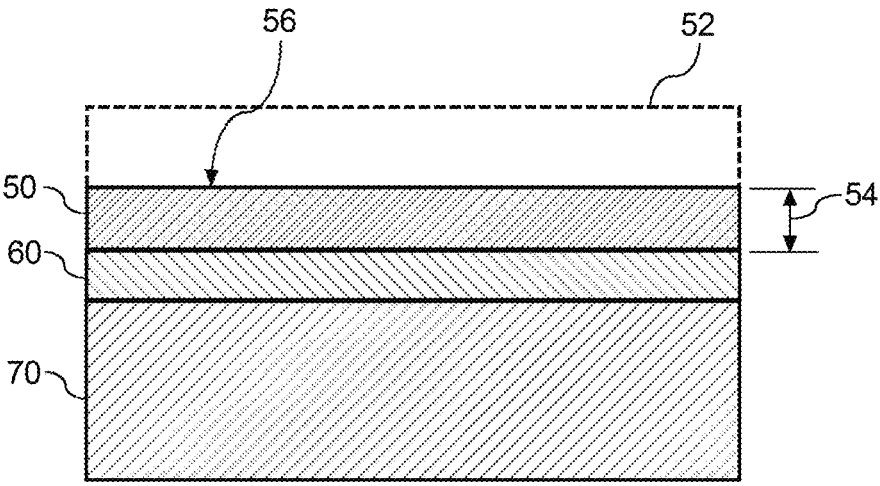
FIG. 4 is a schematic of the component of FIG. 2 after a portion of the additive layer has been removed according to example embodiments of the present disclosure.

As shown in FIG. 4, oxide layer 40 and a portion 52 of additive layer 50 of diffusion coating 20 can also be selectively removed from coated superalloy component 10 by laser beam pulses. Removing portion 52 of additive layer 50 creates an exposed portion 56 of additive layer 50. Although not depicted in FIG. 4, removal of the portion 52 may also create an exposed portion of diffusion zone 60 (e.g., exposed portion 61 depicted in FIG. 3) in addition to the exposed portion 56 of additive layer 50. Also not depicted in FIG. 4, the portion 52 that is removed may include the entirety of additive layer 50, or substantially all of additive layer 50, such that the diffusion zone 60 is substantially or completely exposed. Portion 52 of additive layer 50 removed is 25% to 100%, or alternatively 25% to 80%, or alternatively 30% to 50% of thickness 54 of additive layer 50. Further, the thickness removed may vary at locations along the surface. A pulsed laser capable of generating laser beam pulses is utilized to remove portion of additive layer 50. The pulsed laser parameters are such that selective removal of a portion of additive layer 50 or all of additive layer 50 is possible. The laser beam pulses used in the current method allow for a visual inspection of removal of portion 52 of additive layer 50. Laser beam pulses used to remove the additive layer 50 remove little or none of the diffusion zone 60 and do not remove any part of underlying superalloy substrate 70.

Figure 5:
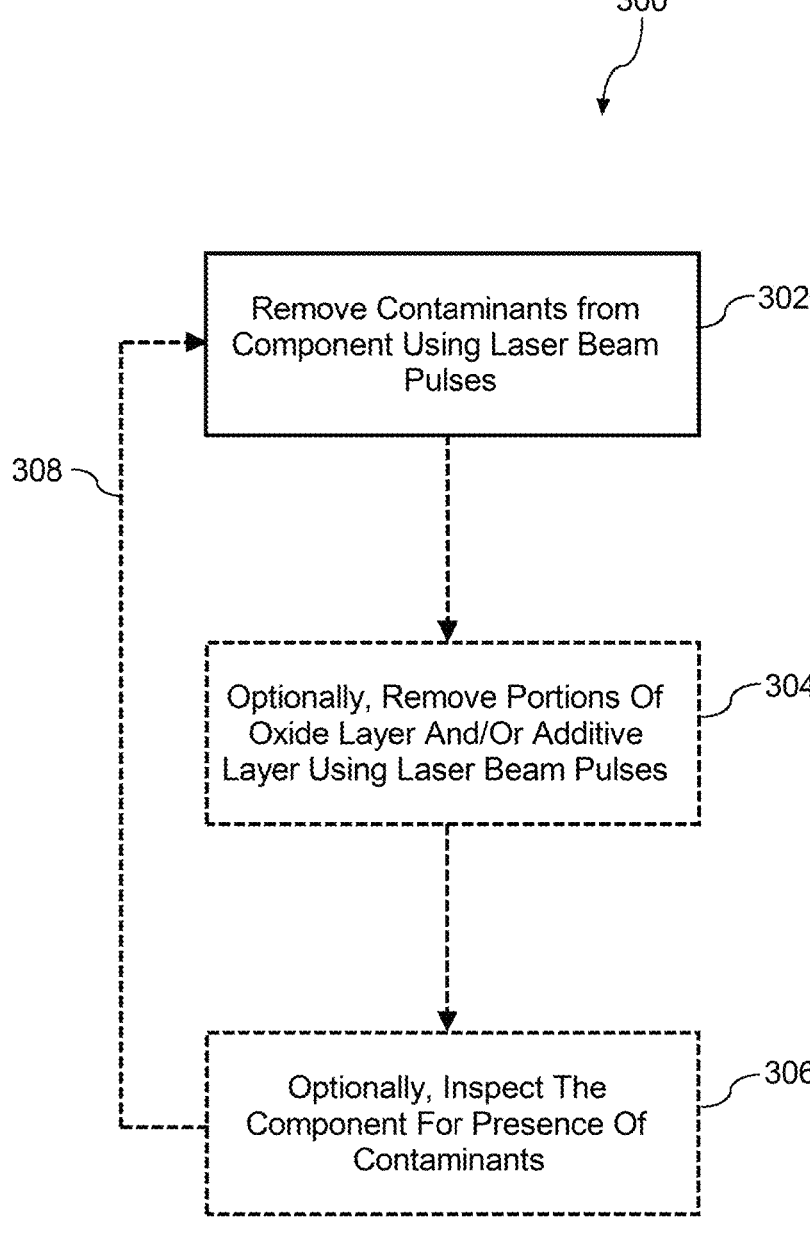
FIG. 5 is a flowchart of an exemplary method of removing contaminants from a coated superalloy component according to example embodiments of the present disclosure.

FIG. 5 is a flow chart describing a method 300 for removal of contaminants from the diffusion coating 20 of a coated superalloy component 10 (see FIG. 3). The contaminant present on the coated superalloy component 10 is a result of service in a turbine. Diffusion coating 20 includes optional oxide layer 40, additive layer 50 and diffusion zone 60 on superalloy substrate 70 of coated superalloy component 10. At 302, method 300 includes selectively removing contaminants 12 by subjecting the component to laser beam pulses. Optionally, at 304, portions of the oxide layer 40 and portions of the additive layer 50 may also be removed by subjecting the component to laser beam pulses. Method 300 may further optionally include, at 306, inspection of the component 10 for the continued presence of contaminants. At 308, the removal of contaminants (302), optional removal of oxide layer and additive layer 50 (304), and inspection (306) may be repeated, thus alternating between removal and inspection, until all of the contaminant is removed. In other embodiments, subjecting the component to the laser beam pulses at 302 continues uninterrupted until removal of the contamination is complete. Inspection may be omitted or may be performed concurrently. Inspection may be a visual inspection or by means other than visual inspection.

Various operating parameters of a pulsed laser are provided that allow for selective removal of contaminants 12 from the component 10. For example, the pulsed laser can have a frequency of 10 kHz to 250 kHz, such as from 25 to 200, such as from 50 to 150. In embodiments, the pulsed laser can have a frequency of 20 KHz. The laser beam pulses can have an energy per pulse of equal to or less than of 1 millijoule (mJ). Each pulse typically has a pulse length of 10 and 500 nanoseconds, such as from 20 to 100 nanoseconds. The laser beam pulses provide a laser spot beam having a diameter of 75 µm to 95 µm, such as 85 µm. The laser beam pulses have an energy density in the range of 17,000 mJ/cm$^2$ to 18,000 mJ/cm$^2$, such as from 17,200 mJ/cm$^2$ to 17,800 mJ/cm$^2$, such as from 17,600 mJ/cm$^2$ to 17,700 mJ/cm$^2$. The pulsed laser used to deliver the laser beam pulses can have an output power of 50 W to 1000 W, such as 100 W. The method may be carried out with any suitable pulsed laser including a Nd:YAG laser. The provided parameters are such that little to none of the diffusion zone 60 is removed. Furthermore, the provided parameters effectively remove contaminants 12 without removing any part of the underlying superalloy substrate 70. Additionally, the provided parameters can be used to remove portions of oxide layer 40 and additive layer 50 from component 10. In an embodiment, the various parameters are pre-selected to achieve a target outcome and may be based on the type, extent and location of the contaminants. Additionally, the various parameters may be controlled during the method to affect the outcome, such as by adjusting one or more of the parameters to increase or decrease the parameter value. For example, adjustments may be made to decrease the heat affected zone, increase or decrease the rate of material removal, or increase or decrease the diameter of the laser spot beam or pulse length.

Prior to selectively removing contaminants (302), coated superalloy component 10 can be degreased or hot water washed to remove any residue oil and grease from surface of coated superalloy component 10. Optionally, component 10 can be subjected to an aqueous cleaning process prior to selectively removing contaminants 12. Once contaminants 12 have been removed, the component 10 itself or the diffusion coating can be repaired. For instance, once contaminants 12 have been removed, component 10 can be repaired as needed. For example, repairing coated superalloy component 10 includes, but is not limited to, spot welding, MIG welding, TIG welding, and brazing. Furthermore, a diffusion coating can be applied to areas where the contaminants 12 have been removed to provide a rejuvenated coated component. In embodiments, method 300 applies to coated superalloy components 10 needing at least a portion of the aluminide coating removed. Coated superalloy components 10 include, for example, but not limited to, blades, vanes, nozzles, stators, shrouds, buckets, and combinations thereof.

Figure 6:
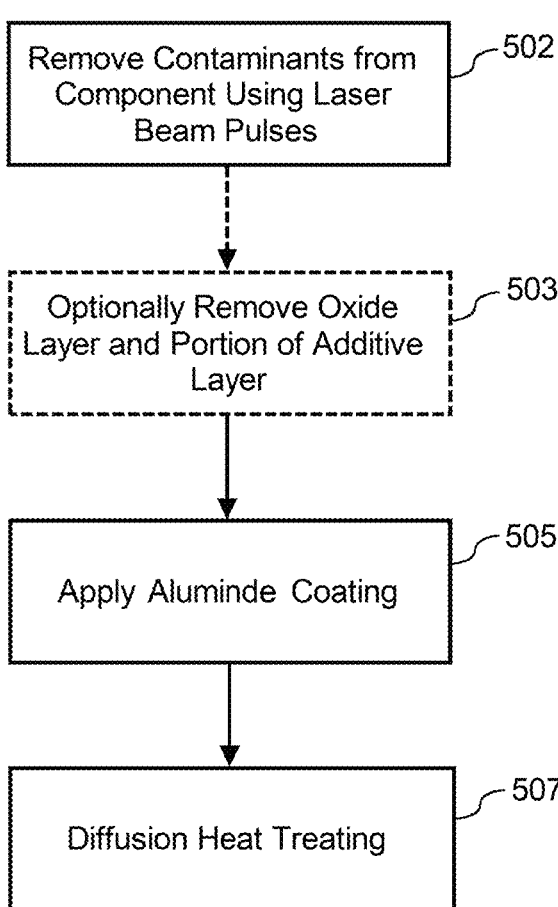
FIG. 6 is a flow chart of a method of rejuvenating a coated superalloy component having undergone service at an elevated temperature according to example embodiments of the present disclosure.

FIG. 6 is a flow chart describing method 500 for rejuvenating coated superalloy component 10 after coated superalloy component 10 has undergone service at an elevated temperature of approximately 800° C. or greater. As used herein rejuvenated coating means forming a new coating including the remaining portions of the existing diffusion coating and new applied vapor phase deposition or a gel aluminide coating, where the new rejuvenated coating has the same microstructure and chemistry as the OEM diffusion coating prior to service, meaning that the microstructure and chemistry are substantially similar to identical. Contamination present on (or in) the diffusion coating of superalloy component 10 results from the service in a turbine. Diffusion coating 20 includes optional oxide layer 40, additive layer 50 and diffusion zone 60 on superalloy substrate 70 of coated superalloy component 10. At 502, method 500 includes removing contaminants 12 from the superalloy component 10 using laser beam pulses. Removal of the contaminants creates exposed portion 61 of the diffusion zone 60 and/or exposed portion 56 of the additive layer 50.

Various operating parameters of a pulsed laser are provided that allow for selective removal of contaminants 12 from the component 10. For example, the pulsed laser can have a frequency of 10 kHz to 250 kHz, such as from 25 to 200, such as from 50 to 150. In embodiments, the pulsed laser can have a frequency of 20 KHz. The laser beam pulses can have an energy per pulse of equal to or less than of 1 millijoule (mJ). Each pulse typically has a pulse length of 10 and 500 nanoseconds, such as from 20 to 100 nanoseconds. The laser beam pulses provide a laser spot beam having a diameter of 75 µm to 95 µm, such as 85 µm. The laser beam pulses have an energy density in the range of 17,000 mJ/cm$^2$ to 18,000 mJ/cm$^2$, such as from 17,200 mJ/cm$^2$ to 17,800 mJ/cm$^2$, such as from 17,600 mJ/cm$^2$ to 17,700 mJ/cm$^2$. The pulsed laser used to deliver the laser beam pulses can have an output power of 50 W to 1000 W, such as 100 W. The method may be carried out with any suitable pulsed laser including an Nd:YAG laser. In an embodiment, the various pulsed laser beam parameters described above are controlled to yield a desired outcome. In one embodiment, the parameters are controlled by pre-selecting the parameters to achieve a target outcome based on the type, extent and location of the contaminants. Additionally, the various parameters may be controlled during the method to affect the outcome, such as by adjusting one or more of the parameters to increase or decrease the parameter value. For example, adjustments may be made to decrease the heat affected zone, increase or decrease the rate of material removal, or increase or decrease the diameter of the laser spot beam or pulse length. Adjustments may be made during the pulsing of the laser beam (i.e., on the fly) or between repetitions of the laser beam pulsing (i.e., after inspection and before repeating the laser beam pulsing).

At 503, optionally the method 500 includes selectively removing oxide layer 40 (if present) and a portion 52 of additive layer 50 by further subjecting the component to the laser beam pulses. Removal of the oxide layer 40 and a portion 52 of additive layer 50 creates an exposed portion 56 of the additive layer 50. Removal of the entire thickness of the additive layer 50 at any location on the surface creates an exposed portion 61 of the diffusion zone 60. The portion 52 of additive layer 50 removed can include removing 25% to 100% of thickness 54 of additive layer 50. Exposure to laser beam pulses of the current method removes little or none of the diffusion zone 60 and does not remove any part of underlying superalloy substrate 70. Visual inspection can be used to determine whether a desired portion of additive layer 50 has been removed. Diffusion zone 60 is generally a shinier gray metal than the additive layer 50, which has more of a matte or dull gray metal finish, such that the remaining thickness of additive layer 50 can been seen without the use of special tools. Means of inspection other than visual inspection may also be used. If needed, subjecting the component to the laser beam pulses (502 and 503) and inspecting the component can be alternatingly repeated (e.g., as shown with steps 306 and 308 of FIG. 5) until the desired removal is complete. As stated above, laser beam pulse parameters may be adjusted between repetitions.

At 505, method 500 includes applying an aluminide coating to exposed portion 61 and/or exposed portion 56. The aluminide coating can be applied by any suitable process such as vapor phase deposition or a gel aluminide coating process.

At 507, method 500 includes heat treating at a preselected elevated temperature to form a rejuvenated protective aluminide coating on superalloy component 10. Heat treating includes using a furnace or other heat source to bring up the temperature of the superalloy component 10 to open up the metal of substrate 70 to allow the material from the diffusion zone 60 to flow into substrate 70 and bond with the base material to form the rejuvenated protective aluminide coating. The rejuvenated protective aluminide coating has a coating microstructure and a coating chemistry matching an original diffusion coating of a new superalloy component prior to service in a turbine, meaning that the microstructure and chemistry are substantially similar to identical.

Prior to removing contaminants (502), optionally, coated superalloy component 10 can be degreased or hot water washed to remove any residue oil and grease from surface of coated superalloy component 10. Additionally, in some embodiments the surface of the coated alloy component can be exposed to an aqueous cleaning process. An optional additional step after removing the contaminants and/or portion of the additive layer is removing any remaining grit or debris from the surface of the component by grit blasting or air blasting. Another optional additional step after removing the contaminants and/or portion of the additive layer and prior to applying the aluminide coating is repairing the coated superalloy component. Method 500 applies to coated superalloy components 10 needing aluminide coating removal, which include, blades, vanes, nozzles, stators, shrouds, buckets, and combinations thereof.

Further aspects of the invention are provided by the subject matter of the following clauses:

A method for the removal of a contaminant from a coated superalloy component having a diffusion coating comprising an additive layer on a surface of the component and a diffusion zone in the surface of the component, the method comprising: subjecting the surface of the coated superalloy component having the contaminant thereon to laser beam pulses to remove the contaminant from the component such that the contaminant is removed without damaging or removing the diffusion zone of the diffusion coating.

The method of any preceding clause wherein the diffusion coating is an aluminide diffusion coating.

The method of any preceding clause wherein the contaminant comprises one or more of hot corrosion products, oxides, dirt, dust, or combinations thereof.

The method of any preceding clause wherein subjecting the surface of the component to laser beam pulses creates an exposed portion of the diffusion zone, an exposed portion of the additive layer, or both.

The method of any preceding clause further comprising applying a diffusion coating material to the exposed portion of the diffusion zone or the exposed portion of the additive layer to form a rejuvenated protective diffusion coating on the component.

The method of any preceding clause wherein the rejuvenated protective diffusion coating has a coating microstructure and a coating chemistry matching a first-time diffusion coating of the component prior to service in a turbine.

The method of any preceding clause further comprising inspecting the component for the presence of the contaminant, the method including alternating the subjecting the surface to laser beam pulses to remove the contaminant and the inspecting the component until all of the contaminant is removed from the component.

The method of any preceding clause wherein the laser beam pulses have an energy of equal to or less than 1 millijoule/pulse.

The method of any preceding clause wherein the laser beam pulses have a pulse length of 20 nanoseconds to 100 nanoseconds.

The method of any preceding clause wherein the laser beam pulses, upon impacting the surface of the component, provide a laser spot beam having a diameter of 75 µm to 95 µm.

The method of any preceding clause wherein the laser beam pulses provide an energy density in a range of 17,600 to 17,700 joules/cm².

The method of any preceding clause wherein a laser emitting the pulsed laser beam has a frequency of 10 kHz to 250 kHz.

The method of any preceding clause wherein a laser emitting the pulsed laser beam has an output power of 50 W to 1000 W.

A method for rejuvenating a superalloy component that has undergone service in a turbine at an elevated temperature, the superalloy component having a diffusion coating comprising an additive layer on a surface of the component and a diffusion zone in the surface of the component, the method comprising: removing a contaminant from the component by subjecting the component to laser beam pulses to remove the contaminant from the component such that the contaminant is removed without damaging or removing the diffusion zone of the diffusion coating creating an exposed portion of the diffusion zone or an exposed portion of the additive layer; applying an aluminide coating to the exposed portion of diffusion zone or the exposed portion of additive layer; and diffusion heat treating at a preselected elevated temperature to form a rejuvenated protective aluminide coating on the superalloy component.

The method of any preceding clause wherein the rejuvenated protective aluminide coating has a coating microstructure and a coating chemistry matching the diffusion coating prior to having undergone service in a turbine.

The method of any preceding clause wherein the diffusion coating is an aluminide coating.

The method of any preceding clause wherein the laser beam pulses have (i) an energy of equal to or less than 1 millijoule/pulse, (ii) a pulse length of 20 nanoseconds to 100 nanoseconds, or (iii) provide an energy density in a range of 17,600 to 17,700 joules/cm².

The method of any preceding clause further comprising, prior to applying the aluminide coating, selectively removing at least a portion of the additive layer by further subjecting the component to the laser beam pulses.

The method of any preceding clause further comprising, prior to applying the aluminide coating: inspecting the component to determine if removal of the contaminant and the portion of the additive layer is complete; and alternating the subjecting the component to the laser beam pulses and the inspecting the component until it is determined that the removal is complete.

The method of any preceding clause wherein subjecting the component to the laser beam pulses to remove the contaminant and to selectively remove at least a portion of the additive layer includes controlling one or more parameters of the laser beam pulses.

The method of any preceding clause comprising optionally, removing at least a portion of the additive layer using laser beam pulses.

The method of any preceding clause comprising optionally, repairing the coated superalloy component.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for rejuvenating a superalloy component that has undergone service in a turbine at an elevated temperature, the superalloy component having a diffusion coating comprising an additive layer on a surface of the component and a diffusion zone in the surface of the component, the method comprising:
   removing a contaminant from the component by subjecting the component to laser beam pulses to remove the contaminant from the component such that the contaminant is removed without damaging or removing the diffusion zone of the diffusion coating creating an exposed portion of the diffusion zone or an exposed portion of the additive layer;
   applying an aluminide coating to the exposed portion of diffusion zone or the exposed portion of additive layer; and
   diffusion heat treating at a preselected elevated temperature to form a rejuvenated protective aluminide coating on the superalloy component.

2. The method of claim 1, wherein the rejuvenated protective aluminide coating has a coating microstructure and a coating chemistry matching the diffusion coating prior to having undergone service in a turbine.

3. The method of claim 1, wherein the diffusion coating is an aluminide coating.

4. The method of claim 1, wherein the laser beam pulses have an energy of equal to or less than 1 millijoule/pulse.

5. The method of claim 1, wherein the laser beam pulses have a pulse length of 20 nanoseconds to 100 nanoseconds.

6. The method of claim 1, wherein the laser beam pulses provide an energy density in a range of 17,600 to 17,700 joules/cm$^2$.

7. The method of claim 1, wherein the laser beam pulses have (i) an energy of equal to or less than 1 millijoule/pulse, (ii) a pulse length of 20 nanoseconds to 100 nanoseconds, and (iii) provide an energy density in a range of 17,600 to 17,700 joules/cm$^2$.

8. The method of claim 1, wherein the laser beam pulses, upon impacting the surface of the component, provide a laser spot beam having a diameter of 75 μm to 95 μm.

9. The method of claim 1, wherein a laser emitting the laser beam pulses has a frequency of 10 kHz to 250 kHz.

10. The method of claim 1, wherein a laser emitting the pulsed laser beam has an output power of 50 W to 1000 W.

11. The method of claim 1, further comprising:
   prior to applying the aluminide coating, inspecting the component to determine if removal of the contaminant and the portion of the additive layer is complete.

12. The method of claim 11, further comprising:
   alternating the removing the contaminant by subjecting the component to the laser beam pulses and the inspecting the component until it is determined that the removal is complete.

13. The method of claim 1, further comprising:
   controlling one or more parameters of the laser beam pulses to remove the contaminant.

14. The method of claim 1, wherein the contaminant comprises one or more of hot corrosion products, oxides, dirt, dust, or combinations thereof.

15. The method of claim 1, wherein a portion that is removed from the component includes an entirety of additive layer such that the diffusion zone is substantially or completely exposed.

16. The method of claim 1, wherein a portion that is removed from the component includes 25% to 80% of the additive layer.

17. The method of claim 1, wherein a portion that is removed from the component includes 30% to 50% of a thickness of additive layer.

18. The method of claim 1, further comprising:
   prior to removing a contaminant from the component by subjecting the component to laser beam pulses, degreasing the surface of the component to remove any residue oil or grease from the surface of the component.

19. The method of claim 1, wherein the coated superalloy component is a blade, a vane, a nozzle, a stator, a shroud, or a bucket.

* * * * *